United States Patent
McCloud et al.

(10) Patent No.: US 12,337,903 B2
(45) Date of Patent: Jun. 24, 2025

(54) REINFORCED PREFORMS FOR OPTIMIZED COMPOSITE STRUCTURES

(71) Applicant: Wabash National, L.P., Lafayette, IN (US)

(72) Inventors: Travis S. McCloud, Malabar, FL (US); Scott M. Lewit, Indialantic, FL (US); Josh Hagan, Indialantic, FL (US)

(73) Assignee: Wabash National, L.P., Lafayette, IN (US)

( * ) Notice: Subject to any disclaimer, the term of this patent is extended or adjusted under 35 U.S.C. 154(b) by 551 days.

(21) Appl. No.: 17/691,387

(22) Filed: Mar. 10, 2022

(65) Prior Publication Data

US 2022/0289307 A1    Sep. 15, 2022

Related U.S. Application Data

(60) Provisional application No. 63/160,070, filed on Mar. 12, 2021.

(51) Int. Cl.
| | |
|---|---|
| B62B 1/00 | (2006.01) |
| B29C 70/30 | (2006.01) |
| B29C 70/68 | (2006.01) |
| B62D 25/20 | (2006.01) |
| B62D 29/00 | (2006.01) |
| B62D 29/04 | (2006.01) |
| B29L 31/30 | (2006.01) |

(52) U.S. Cl.
CPC .......... B62D 25/2054 (2013.01); B29C 70/30 (2013.01); B29C 70/68 (2013.01); B62D 29/001 (2013.01); B62D 29/043 (2013.01); B29L 2031/30 (2013.01)

(58) Field of Classification Search
CPC ......... B29C 70/30; B29C 70/68; B29C 70/86; B62D 29/001; B62D 29/043; B62D 25/2054; B29L 2031/30
USPC ....................................................... 296/184.1
See application file for complete search history.

(56) References Cited

U.S. PATENT DOCUMENTS

| 1,552,585 A | 9/1925 | Synck |
| 2,478,993 A | 8/1949 | Wing |

(Continued)

FOREIGN PATENT DOCUMENTS

| AU | 07132/60 B2 | 11/1999 |
| CA | 1329818 C | 5/1994 |

(Continued)

OTHER PUBLICATIONS

"A Study of the Reaction Kinetics of Polyisocyanurate Foam Formulations using Real-time FTIR" Romero et al., J Cellular Plastics, 41:339-59 (2005).

(Continued)

*Primary Examiner* — Steven O Douglas
(74) *Attorney, Agent, or Firm* — Faegre Drinker Biddle & Reath LLP (57) ABSTRACT

A composite structure of a cargo vehicle and a method of making the same are disclosed, where the composite structure includes one or more reinforced beams. Each of the reinforced beams includes an inner core surrounded by an outer layer and one or more reinforcing structures extending through the inner core. Each of the one or more reinforcing structures provides structural support to the reinforced beams.

13 Claims, 6 Drawing Sheets

(56) References Cited

U.S. PATENT DOCUMENTS

| | | | |
|---|---|---|---|
| 3,132,604 | A | 5/1964 | Tappan et al. |
| 3,367,992 | A | 2/1968 | Bearden |
| 3,557,992 | A | 1/1971 | Reeves |
| 3,598,412 | A | 8/1971 | Lippert |
| 3,637,252 | A | 1/1972 | Metsker |
| 3,705,732 | A | 12/1972 | Marinelli |
| 3,857,752 | A | 12/1974 | McCoy |
| 3,910,624 | A | 10/1975 | Becker |
| 3,996,307 | A | 12/1976 | Najvar et al. |
| 4,049,285 | A | 9/1977 | Chieger |
| 4,197,390 | A | 4/1980 | Jackson |
| 4,239,276 | A | 12/1980 | Bertolini |
| 4,280,979 | A | 7/1981 | Dunleavy et al. |
| 4,296,220 | A | 10/1981 | Seeburger et al. |
| 4,302,553 | A | 11/1981 | Frisch et al. |
| 4,399,642 | A | 8/1983 | Bard et al. |
| 4,409,274 | A | 10/1983 | Chaplin et al. |
| 4,418,507 | A | 12/1983 | Roberts et al. |
| 4,421,827 | A | 12/1983 | Phillips |
| 4,498,264 | A | 2/1985 | McCafferty et al. |
| 4,685,720 | A | 8/1987 | Oren et al. |
| 4,758,299 | A | 7/1988 | Burke |
| 4,822,849 | A | 4/1989 | Vanderlaan |
| 4,892,919 | A | 1/1990 | Leitheiser et al. |
| 4,921,658 | A | 5/1990 | Pennington et al. |
| 4,923,934 | A | 5/1990 | Werner |
| 4,951,992 | A | 8/1990 | Hockney |
| 4,976,490 | A | 12/1990 | Gentle |
| 4,997,705 | A | 3/1991 | Caprette et al. |
| 5,096,640 | A | 3/1992 | Brody et al. |
| 5,143,418 | A | 9/1992 | Fouquet |
| 5,153,261 | A | 10/1992 | Brooks |
| 5,159,044 | A | 10/1992 | Bogner |
| 5,281,634 | A | 1/1994 | Hesse et al. |
| 5,296,544 | A | 3/1994 | Heise et al. |
| 5,296,545 | A | 3/1994 | Heise |
| 5,302,634 | A | 4/1994 | Mushovic |
| 5,344,852 | A | 9/1994 | Brooks et al. |
| 5,346,233 | A | 9/1994 | Moser |
| 5,369,147 | A | 11/1994 | Mushovic |
| 5,382,626 | A | 1/1995 | Credali et al. |
| 5,403,063 | A | 4/1995 | Sjostedt et al. |
| 5,429,066 | A | 7/1995 | Lewit et al. |
| 5,464,919 | A | 11/1995 | Sinclair |
| 5,501,504 | A | 3/1996 | Kunz |
| 5,507,405 | A | 4/1996 | Thomas et al. |
| 5,508,315 | A | 4/1996 | Mushovic |
| 5,509,714 | A | 4/1996 | Schmidt |
| 5,562,981 | A | 10/1996 | Ehrlich |
| 5,588,693 | A | 12/1996 | Higginson et al. |
| 5,589,243 | A * | 12/1996 | Day .................... B29C 44/5654 428/56 |
| 5,604,266 | A | 2/1997 | Mushovic |
| 5,664,518 | A | 9/1997 | Lewit et al. |
| 5,700,118 | A | 12/1997 | Bennett et al. |
| 5,756,600 | A | 5/1998 | Okumura et al. |
| 5,765,639 | A | 6/1998 | Muth |
| 5,772,276 | A | 6/1998 | Fetz et al. |
| 5,800,749 | A * | 9/1998 | Lewit .................... B29C 70/086 264/273 |
| 5,802,984 | A | 9/1998 | Thoman et al. |
| 5,821,296 | A | 10/1998 | Borden |
| 5,830,308 | A | 11/1998 | Reichard |
| 5,860,668 | A | 1/1999 | Hull et al. |
| 5,860,693 | A | 1/1999 | Ehrlich |
| 5,872,196 | A | 2/1999 | Murata et al. |
| 5,890,435 | A | 4/1999 | Thoman et al. |
| 5,897,818 | A | 4/1999 | Lewit et al. |
| 5,908,591 | A | 6/1999 | Lewit et al. |
| 5,916,093 | A | 6/1999 | Fecko et al. |
| 5,919,844 | A | 7/1999 | Shimizu et al. |
| 5,934,741 | A | 8/1999 | Beukers et al. |
| 5,936,034 | A | 8/1999 | Smith |
| 5,952,436 | A | 9/1999 | Cai et al. |
| 5,979,684 | A | 11/1999 | Ohnishi et al. |
| 5,992,117 | A | 11/1999 | Schmidt |
| 6,004,492 | A | 12/1999 | Lewit et al. |
| 6,007,894 | A * | 12/1999 | Barnes .................... B29C 70/30 156/184 |
| 6,013,213 | A | 1/2000 | Lewit et al. |
| 6,076,693 | A | 6/2000 | Reiter et al. |
| 6,082,810 | A | 7/2000 | Bennett |
| 6,092,472 | A | 7/2000 | Thoman et al. |
| 6,159,414 | A | 12/2000 | Tunis et al. |
| 6,199,939 | B1 | 3/2001 | Ehrlich |
| 6,206,669 | B1 | 3/2001 | Lewit et al. |
| 6,211,259 | B1 | 4/2001 | Borden et al. |
| 6,220,651 | B1 | 4/2001 | Ehrlich |
| 6,227,125 | B1 | 5/2001 | Schroeder et al. |
| 6,247,747 | B1 | 6/2001 | Kawanomoto et al. |
| 6,283,538 | B1 | 9/2001 | Reitnouer |
| 6,318,794 | B1 | 11/2001 | Berube |
| 6,349,988 | B1 | 2/2002 | Foster et al. |
| 6,374,546 | B1 | 4/2002 | Fecko et al. |
| 6,451,430 | B1 | 9/2002 | Smith |
| 6,467,118 | B2 | 10/2002 | Dumlao et al. |
| 6,496,190 | B1 | 12/2002 | Driemeyer et al. |
| 6,497,190 | B1 | 12/2002 | Lewit |
| 6,497,932 | B1 | 12/2002 | Muench et al. |
| 6,502,894 | B1 | 1/2003 | Ingram et al. |
| 6,505,883 | B1 | 1/2003 | Ehrlich |
| 6,543,469 | B2 | 4/2003 | Lewit et al. |
| 6,615,741 | B2 | 9/2003 | Fecko et al. |
| 6,626,622 | B2 | 9/2003 | Zubko |
| 6,659,020 | B1 | 12/2003 | Ball |
| 6,660,373 | B2 | 12/2003 | Hsu et al. |
| 6,688,835 | B1 | 2/2004 | Buher |
| 6,723,273 | B2 | 4/2004 | Johnson et al. |
| 6,726,435 | B1 | 4/2004 | Williams et al. |
| 6,740,381 | B2 | 5/2004 | Day et al. |
| 6,745,470 | B2 | 6/2004 | Foster et al. |
| 6,755,998 | B1 | 6/2004 | Reichard et al. |
| 6,761,840 | B2 | 7/2004 | Fecko et al. |
| 6,773,023 | B2 | 8/2004 | Athans et al. |
| 6,780,923 | B2 | 8/2004 | Guha et al. |
| 6,797,102 | B2 | 9/2004 | Garcia et al. |
| 6,824,341 | B2 | 11/2004 | Ehrlich |
| 6,843,525 | B2 | 1/2005 | Preisler |
| 6,854,791 | B1 | 2/2005 | Jaggi |
| 6,863,339 | B2 | 3/2005 | Boehm et al. |
| 6,869,561 | B2 | 3/2005 | Johnson et al. |
| 6,877,940 | B2 | 4/2005 | Nelson et al. |
| 6,893,075 | B2 | 5/2005 | Fenton et al. |
| 6,911,252 | B2 | 6/2005 | Lewit et al. |
| 6,986,546 | B2 | 1/2006 | Ehrlich |
| 7,000,978 | B1 | 2/2006 | Messano |
| 7,025,166 | B2 | 4/2006 | Thomas |
| 7,025,408 | B2 | 4/2006 | Jones et al. |
| 7,069,702 | B2 | 7/2006 | Ehrlich |
| 7,114,762 | B2 | 10/2006 | Smidler |
| 7,134,820 | B2 | 11/2006 | Ehrlich |
| 7,140,642 | B2 | 11/2006 | Ito et al. |
| 7,150,915 | B2 | 12/2006 | Kia et al. |
| 7,182,396 | B2 | 2/2007 | Taylor |
| 7,189,345 | B2 | 3/2007 | Sewell et al. |
| 7,217,771 | B2 | 5/2007 | Setiabudi |
| 7,219,952 | B2 | 5/2007 | Taylor |
| 7,264,305 | B2 | 9/2007 | Kuriakose |
| 7,287,797 | B1 * | 10/2007 | Belloso .................. B62D 21/03 296/193.07 |
| 7,353,960 | B2 | 4/2008 | Seiter |
| 7,407,216 | B2 | 8/2008 | Taylor |
| 7,434,520 | B2 | 10/2008 | Zupancich et al. |
| 7,451,995 | B2 | 11/2008 | Bloodworth et al. |
| 7,461,888 | B2 | 12/2008 | Brown |
| 7,517,005 | B2 | 4/2009 | Kuriakose |
| 7,575,264 | B1 | 8/2009 | Solomon |
| 7,578,534 | B2 | 8/2009 | Wuerfel, III |
| 7,578,541 | B2 | 8/2009 | Layfield et al. |
| 7,587,984 | B2 | 9/2009 | Zupancich et al. |
| 7,588,286 | B2 | 9/2009 | Lewallen et al. |
| 7,594,474 | B2 | 9/2009 | Zupancich |
| 7,608,313 | B2 | 10/2009 | Solomon et al. |
| 7,621,589 | B1 | 11/2009 | Gerome |

(56) References Cited

U.S. PATENT DOCUMENTS

| | | |
|---|---|---|
| 7,638,085 B2 | 12/2009 | Caiazzo |
| 7,704,026 B2 | 4/2010 | Roush et al. |
| 7,722,112 B2 | 5/2010 | Ehrlich |
| 7,748,172 B2 | 7/2010 | Zupancich et al. |
| 7,762,618 B2 | 7/2010 | Lewallen et al. |
| 7,770,928 B2 | 8/2010 | Booher |
| 7,790,076 B2 | 9/2010 | Seiter et al. |
| 7,829,165 B2 | 11/2010 | Grandominico et al. |
| 7,887,120 B2 | 2/2011 | Boivin et al. |
| 7,901,537 B2 | 3/2011 | Jones et al. |
| 7,905,072 B2 | 3/2011 | Verhaeghe |
| 7,914,034 B2 | 3/2011 | Roush |
| 7,931,328 B2 | 4/2011 | Lewallen et al. |
| 7,980,840 B2 | 7/2011 | Burchardt et al. |
| 8,016,322 B2 | 9/2011 | Keehan et al. |
| 8,056,960 B2 | 11/2011 | Brown |
| 8,096,728 B2 | 1/2012 | Stasiewich et al. |
| 8,186,747 B2 | 5/2012 | Bloodworth et al. |
| 8,263,217 B2 | 9/2012 | Verhaeghe |
| 8,297,027 B2 | 10/2012 | Noble et al. |
| 8,342,588 B2 | 1/2013 | Skaradzinski |
| 8,361,590 B2 | 1/2013 | Chakraborty et al. |
| 8,448,989 B2 | 5/2013 | Verhaeghe |
| 8,465,042 B2 | 6/2013 | Knollman |
| 8,474,171 B1 | 7/2013 | Simmons |
| 8,474,871 B1 | 7/2013 | Ludwick |
| 8,696,048 B2 | 4/2014 | Griffin et al. |
| 8,757,704 B2 | 6/2014 | Zhao et al. |
| 8,814,255 B2 | 8/2014 | Yamaji et al. |
| 8,876,193 B2 | 11/2014 | Kunkel et al. |
| 8,882,041 B2 | 11/2014 | Mueller et al. |
| 8,950,144 B2 | 2/2015 | Padmanabhan |
| 9,051,014 B2 | 6/2015 | Lookebill et al. |
| 9,138,943 B2 | 9/2015 | Weinberg et al. |
| 9,138,974 B2 | 9/2015 | Weinberg et al. |
| 9,138,975 B2 | 9/2015 | Weinberg et al. |
| 9,174,656 B2 | 11/2015 | Heitmeyer et al. |
| 9,199,440 B2 | 12/2015 | Weinberg et al. |
| 9,205,635 B2 | 12/2015 | Weinberg et al. |
| 9,260,117 B2 | 2/2016 | Vande Sande |
| 9,317,468 B2 | 4/2016 | Liebald et al. |
| 9,339,987 B2 | 5/2016 | Weinberg et al. |
| 9,371,468 B2 | 6/2016 | Lewit |
| 9,399,492 B2 | 7/2016 | Booher |
| 9,409,607 B2 | 8/2016 | Osten |
| 9,434,421 B1 | 9/2016 | Lu et al. |
| 9,441,660 B2 | 9/2016 | Meyers |
| 9,499,203 B1 | 11/2016 | Finley |
| 9,566,769 B2 | 2/2017 | Weinberg et al. |
| 9,604,677 B2 | 3/2017 | McKinney et al. |
| 9,650,003 B2 | 5/2017 | Owens et al. |
| 9,708,009 B2 | 7/2017 | Vance |
| 9,738,050 B2 | 8/2017 | Lee et al. |
| 9,744,753 B2 | 8/2017 | Sheffield et al. |
| 9,815,501 B2 | 11/2017 | McCormack et al. |
| 9,827,750 B2 | 11/2017 | Lookebill et al. |
| 9,828,164 B2 | 11/2017 | Denson |
| 9,878,744 B2 | 1/2018 | Lu et al. |
| 9,884,660 B2 | 2/2018 | Fenton |
| 9,884,661 B2 | 2/2018 | Fenton |
| 9,889,637 B2 | 2/2018 | Weinberg et al. |
| 10,239,265 B2 | 3/2019 | Lewit et al. |
| 10,239,566 B2 | 3/2019 | Bauer et al. |
| 10,329,763 B2 | 6/2019 | McCloud et al. |
| 10,407,103 B2 | 9/2019 | Hatke |
| 10,479,419 B2 | 11/2019 | Storz et al. |
| 10,487,864 B2 | 11/2019 | Schmidt et al. |
| 10,549,789 B2 | 2/2020 | McCloud |
| 10,550,569 B2 | 2/2020 | McCloud et al. |
| 10,596,791 B2 | 3/2020 | Lewit |
| 10,596,950 B2 | 3/2020 | Bauer et al. |
| 10,829,163 B2 | 11/2020 | McCloud et al. |
| 10,919,579 B2 | 2/2021 | McCloud et al. |
| 10,967,920 B2 * | 4/2021 | Bauer .................. B62D 33/046 |
| 11,299,213 B2 | 4/2022 | McCloud |
| 11,338,862 B2 | 5/2022 | McCloud et al. |
| 11,400,987 B2 | 8/2022 | McCloud et al. |
| 11,542,005 B2 | 1/2023 | Scheer et al. |
| 2001/0011832 A1 | 8/2001 | Ehrlich et al. |
| 2001/0015222 A1 | 8/2001 | Lewit et al. |
| 2002/0033619 A1 | 3/2002 | Hurst et al. |
| 2005/0194381 A1 | 9/2005 | Zupancich et al. |
| 2005/0241253 A1 | 11/2005 | Song et al. |
| 2006/0065152 A1 | 3/2006 | Heitmeyer et al. |
| 2006/0087152 A1 | 4/2006 | Kuriakose |
| 2006/0108361 A1 | 5/2006 | Seiter |
| 2006/0121244 A1 | 6/2006 | Godwin et al. |
| 2006/0123725 A1 | 6/2006 | Godwin |
| 2006/0144014 A1 | 7/2006 | Yoon et al. |
| 2006/0158005 A1 | 7/2006 | Brown |
| 2006/0179733 A1 | 8/2006 | Padmanabhan |
| 2006/0201081 A1 | 9/2006 | Godwin |
| 2006/0219129 A1 | 10/2006 | Jarvis |
| 2006/0287463 A1 | 12/2006 | Wehner |
| 2007/0001343 A1 | 1/2007 | Pulman et al. |
| 2007/0049686 A1 | 3/2007 | Bauchet et al. |
| 2007/0095092 A1 | 5/2007 | Wuerfel, III |
| 2007/0102961 A1 | 5/2007 | Lemmons |
| 2007/0119850 A1 | 5/2007 | Seiter |
| 2007/0132278 A1 | 6/2007 | Lester et al. |
| 2007/0160793 A1 | 7/2007 | Cageao et al. |
| 2007/0194602 A1 | 8/2007 | Ehrlich |
| 2007/0204550 A1 | 9/2007 | McPherson |
| 2007/0216197 A1 | 9/2007 | Wuerfel, III |
| 2007/0250025 A1 | 10/2007 | Sams et al. |
| 2008/0078038 A1 | 4/2008 | Borazghi |
| 2008/0160307 A1 | 7/2008 | Bauchet et al. |
| 2008/0238180 A1 | 10/2008 | Kraenzle |
| 2008/0258500 A1 | 10/2008 | Booher |
| 2008/0290057 A1 | 11/2008 | Zupancich et al. |
| 2008/0296930 A1 | 12/2008 | Roush et al. |
| 2009/0126600 A1 | 5/2009 | Zupancich et al. |
| 2009/0212533 A1 | 8/2009 | Verhaeghe |
| 2009/0273205 A1 | 11/2009 | Brown |
| 2009/0278386 A1 | 11/2009 | Ehrlich |
| 2010/0019536 A1 | 1/2010 | Bloodworth et al. |
| 2010/0101876 A1 | 4/2010 | Misencik |
| 2010/0109309 A1 | 5/2010 | Kootstra |
| 2010/0170746 A1 | 7/2010 | Restuccia et al. |
| 2010/0266833 A1 | 10/2010 | Day et al. |
| 2011/0010057 A1 | 1/2011 | Kim |
| 2011/0095574 A1 | 4/2011 | Brown |
| 2011/0129608 A1 | 6/2011 | Adzima et al. |
| 2011/0204611 A1 | 8/2011 | Ziegler et al. |
| 2012/0169087 A1 | 7/2012 | Griffin et al. |
| 2012/0313348 A1 | 12/2012 | Pfaff |
| 2013/0207413 A1 | 8/2013 | Lookebill et al. |
| 2013/0207415 A1 | 8/2013 | Wylezinski |
| 2014/0054916 A1 | 2/2014 | Knudtson et al. |
| 2014/0199551 A1 | 7/2014 | Lewit |
| 2014/0262011 A1 | 9/2014 | Lewit et al. |
| 2014/0300134 A1 | 10/2014 | Gerst |
| 2015/0054311 A1 | 2/2015 | Marchesano et al. |
| 2015/0064433 A1 * | 3/2015 | Foster .................. B28B 23/0006 428/218 |
| 2015/0076861 A1 | 3/2015 | Padmanabhan |
| 2015/0078804 A1 | 3/2015 | Ehrlich |
| 2015/0137560 A1 | 5/2015 | Preisler et al. |
| 2015/0158532 A1 | 6/2015 | Ayuzawa et al. |
| 2015/0203160 A1 | 7/2015 | Peterson et al. |
| 2015/0375478 A1 | 12/2015 | Gruhn et al. |
| 2016/0016229 A1 | 1/2016 | Czinger et al. |
| 2016/0101752 A1 | 4/2016 | Batzer et al. |
| 2016/0207484 A1 | 7/2016 | Rogers et al. |
| 2016/0339829 A1 | 11/2016 | McCloud |
| 2017/0057561 A1 | 3/2017 | Fenton |
| 2017/0166263 A1 | 6/2017 | McKinney et al. |
| 2017/0210317 A1 | 7/2017 | Owens et al. |
| 2017/0239916 A1 | 8/2017 | Lewit et al. |
| 2017/0240216 A1 | 8/2017 | Bauer et al. |
| 2017/0240217 A1 | 8/2017 | Storz et al. |
| 2017/0241134 A1 | 8/2017 | McCloud et al. |
| 2017/0247063 A1 | 8/2017 | Banerjee et al. |
| 2017/0253006 A1 | 9/2017 | Lopez et al. |

(56) References Cited

U.S. PATENT DOCUMENTS

| | | |
|---|---|---|
| 2017/0282499 A1 | 10/2017 | Larocco |
| 2017/0298581 A1 | 10/2017 | Lewit et al. |
| 2017/0334489 A1 | 11/2017 | Shin |
| 2017/0355297 A1 | 12/2017 | Chimenti |
| 2018/0029688 A1 | 2/2018 | Connelly et al. |
| 2018/0037151 A1 | 2/2018 | Bauer et al. |
| 2018/0057059 A1 | 3/2018 | Bauer et al. |
| 2018/0194405 A1 | 7/2018 | Hatke |
| 2018/0244321 A1 | 8/2018 | McCloud |
| 2019/0047634 A1 | 2/2019 | McCloud et al. |
| 2019/0176905 A1 | 6/2019 | Bauer et al. |
| 2020/0130752 A1 | 4/2020 | McCloud |
| 2020/0180497 A1 | 6/2020 | Bauer et al. |
| 2021/0188365 A1 | 6/2021 | McCloud et al. |
| 2022/0161871 A1 | 5/2022 | Storz et al. |
| 2022/0332374 A1* | 10/2022 | Robinson ................. C03C 8/00 |
| 2023/0173972 A1 | 6/2023 | Wylezinski |

FOREIGN PATENT DOCUMENTS

| | | | |
|---|---|---|---|
| CA | 2181750 A1 | 1/1997 | |
| CA | 2199584 A1 | 9/1997 | |
| CA | 2551863 A1 | 3/1998 | |
| CA | 2219312 A1 | 4/1998 | |
| CA | 2242467 A1 | 7/1999 | |
| CA | 2261384 A1 | 8/1999 | |
| CA | 2265405 A1 | 1/2000 | |
| CA | 2275848 A1 | 12/2000 | |
| CA | 2382578 A1 | 3/2001 | |
| CA | 2253308 C | 7/2002 | |
| CA | 2455957 A1 | 5/2004 | |
| CA | 2768878 A1 | 3/2005 | |
| CA | 2811134 A1 | 4/2006 | |
| CA | 2529762 A1 | 6/2006 | |
| CA | 2650992 A1 | 11/2006 | |
| CA | 2528558 A1 | 5/2007 | |
| CA | 2565510 A1 | 8/2007 | |
| CA | 2604282 A1 | 3/2008 | |
| CA | 2689745 A1 | 7/2009 | |
| CA | 2689746 A1 | 7/2009 | |
| CA | 2689747 A1 | 7/2009 | |
| CA | 2689748 A1 | 7/2009 | |
| CA | 2689749 A1 | 7/2009 | |
| CA | 2689751 A1 | 7/2009 | |
| CA | 2797778 A1 | 7/2009 | |
| CA | 2802907 A1 | 7/2009 | |
| CA | 2788047 A1 | 8/2011 | |
| CA | 2763094 A1 | 7/2012 | |
| CA | 2807710 A1 | 8/2013 | |
| CA | 2848174 A1 | 10/2014 | |
| CA | 2894959 A1 | 12/2015 | |
| CA | 2977131 A1 | 9/2016 | |
| CA | 2958805 A1 | 8/2017 | |
| CA | 2958838 A1 | 8/2017 | |
| CA | 2958839 A1 | 8/2017 | |
| DE | 2617169 A1 | 11/1977 | |
| DE | 102014107357 A1 | 9/2015 | |
| DE | 112020000494 T5 * | 11/2021 | ....... B29C 45/14065 |
| EP | 1762581 A1 | 3/2007 | |
| EP | 2660119 A1 | 11/2013 | |
| FR | 2858329 A1 | 2/2005 | |
| FR | 3037858 A1 * | 12/2016 | ............ B32B 15/08 |
| JP | 06-293233 A | 10/1994 | |
| JP | 2011-063724 A | 3/2011 | |
| WO | 2004/013236 A2 | 2/2004 | |
| WO | 2006/091446 A1 | 8/2006 | |

OTHER PUBLICATIONS

"Design, synthesis and properties of new materials based on densely crosslinked polymers for polymer optical fiber and amplifier applications" Flipsen, University of Groningen 1-230 (2000).

"Fiber Optic FTIR: A Novel PUR/PIR Catalyst Development Tool" McDaniels et al., Polyurethanes Expo 303-12 (1999) (Abstract).

"Rheology Study in Polyurethane Rigid Foams" Wu et al., Huntsman Corporation (2012).

Black, Sara, "Structural adhesives, Part I: Industrial," CompositesWorld, posted Apr. 11, 2016, 7 pages.

CMS North America, Inc., "Transportation: Refrigerated Semi-trailers, Trailers & Vans," available online at http://www.cmsna.com/13_transportation_refrigerated_semi_trailers_trailer-s_vans.php on or before Jul. 2, 2014, 2 pages.

Composite Marine Control Surface, installed on USS Pioneer (MCM 9), May 1997, 13 pages.

Composite Twisted Rudder, TCC Meeting 2008, handout, 32 pages.

EPO Translation of DE 102014107357A1 (Year: 2019).

Eric Green Associates.com, "Composite Rudders Take Shape for U.S. Navy" available online at http://www.ericgreeneassociates.com/images/Composite_Twisted_Rudder.pdf, accessed as early as Jul. 13, 2014, 7 pages.

Expedition Portal, "Truck Camper Construction Costs?," available online at http://www.expeditionportal.com/forum/threads/12486-Truck-Camper-Construction-Costs at least as early as Jun. 18, 2015, 5 pages.

Griffiths, Bob, "Rudder Gets New Twist with Composites," CompositesWorld, posted Aug. 1, 2006, 4 pages.

Gum, W. et al., "Reaction Polymers", 1992, 50-202.

International Preliminary Report on Patentability received for PCT Patent Application No. PCT/US2014/010545, mailed on Jul. 30, 2015, 10 pages.

International Preliminary Report on Patentability received for PCT Patent Application No. PCT/US2016/019100, mailed on Jun. 8, 2017, 30 pages.

International Preliminary Report on Patentability received for PCT Patent Application No. PCT/US2016/050509, mailed on Dec. 15, 2017, 20 pages.

International Search Report and Written Opinion issued by the ISA/US, Commissioner for Patents, dated May 9, 2016, for International Application No. PCT/US2016/019100; 12 pages.

International Search Report and Written Opinion issued by the ISA/US, Commissioner for Patents, dated Nov. 29, 2016, for International Application No. PCT/US2016/050509; 11 pages.

International Search Report and Written Opinion received for PCT Patent Application No. PCT/US2014/010545, mailed on Jul. 2, 2014, 14 pages.

International Trucking Shows, "True Composites Platform Highlight of International Trucking Show," Aug. 1992, 1 page.

Johnson Truck Bodies, Blizzard Series brochure, accessed as early as Aug. 1, 2014, 8 pages.

Kedward, Keith and Whitney, James, Delaware Composites Design Encyclopedia, "Design Studies," vol. 5, 1990, preview version available at https://books.google.com/books?id=9-KYOm81MWEC&printsec-frontcover#v=0-nepage&q&f-false, 17 pages.

Lightweight Structures B.V., "ColdFeather: lightweight composite isothermal trailer," available online at http://www.lightweight-structures.com/coldfeather-lightweight-composite-i-sothermal-trailer/index.html at least as early as Jun. 18, 2015, 6 pages.

Morey, Bruce, "Advanced Technologies Supplement: Processes Reduce Composite Costs," Advanced Manufacturing, posted Apr. 1, 2007, 7 pages.

Netcompositesnow.com, "Twisted Composites Rudders," available online at http://www.netcomposites.com/news/twisted-composites-rudders/3202 as early as Aug. 11, 2005, 3 pages.

North American Composites, Virtual Engineered Composites (VEC) Article, available online at http://www.nacomposites.com/delivering-performance/page.asp?issueid=7&pag- e=cover, Fall 2006, 4 pages.

Ramis, X. et al., "Polyurethane-unsaturated polyester interpenetrating polymer networks: thermal and dynamic mechanical thermal behaviour," Polymer 42 (2001) 9469-9479.

Reichard, Dr. Ronnal P., "Composites in Theme Parks: From the perspective of a contractor-trouble shooter-enthusiast!" presented at Florida Institute of Technology at least as early as 1999, 37 pages.

Sandler et al., Polymer Syntheses, vol. III, Academic Press (1996), Ch. 4, "Polymerization Reactions of Mono-and Diisocyanates," pp. 120-151.

Scott Bader Group Companies, Crystic, "Composites Handbook", copyright Dec. 2005, 100 pages.

(56) References Cited

OTHER PUBLICATIONS

Seaver, Mark and Trickey, Stephen, "Underwater Blast Loading of a Composite Twisted Rudder with FBGS," dated Apr. 14, 2008, 19th International Conference on Optical Fibre Sensors, 2 pages.

Selby N300 CR product data sheet, Degussa Building Systems, Copyright 2003, 4 pages.

Sonnenschein, Polyurethanes: Science, Technology, Markets, and Trends, Chapter 1, John Wiley & Sons. (Year: 2014).

Sonnenschein, Polyurethanes: Science, Technology, Markets, and Trends, Wiley (2015), pp. 1-9 (introduction) and pp. 255-281, 291-293 (Ch. 8).

Stypol (Registered) & Xycon (Registered) Resins Data Sheet, Cook Composites & Polymers, printed Jan. 13, 2010 and Apr. 21, 2009, 10 pages.

Trailer/Body Builders, "More Emphasis on Less Weight," available at http://trailer-bodybuilders.com/trailers/more-emphasis-less-weight, May 1, 2008, 5 pages.

Wabash National Commercial Trailer Products, DuraPlate.RTM. Dry Freight Truck Bodies, Oct. 2015, 2 pages.

Wang, G. et al., "Interpenetrating polymer networks of polyurethane and graft vinyl ester resin: polyurethane formed with toluene diisocyanate," Eur. Polym. J. 36 (2000), 735-742.

Xycon (Registered) IPN Resin Systems Data Sheet, Cook Composites & Polymers, printed Apr. 21, 2009, 10 pages.

Zweben, Carl, Handbook of Materials Selection, "Chapter 12: Composite Materials," 2002, preview version available at https://books.google.com/books?id=gWg-rchM700C&printsec=frontcover#/v=onep- age&q&f=false, 47 pages.

\* cited by examiner

REINFORCED PREFORMS FOR OPTIMIZED COMPOSITE STRUCTURES

CROSS-REFERENCE TO RELATED APPLICATION

The present application claims priority to U.S. Patent Application No. 63/160,070, filed Mar. 12, 2021, the disclosure of which is incorporated herein by reference.

FIELD OF THE DISCLOSURE

The present disclosure relates generally to composite structures and methods of making the same. More particularly, the present disclosure relates to composite structures for use in cargo vehicles and other applications including reinforced preforms, and methods of making the same.

BACKGROUND OF THE DISCLOSURE

Cargo vehicles are used in the transportation industry for transporting many different types of cargo. Certain cargo vehicles may be refrigerated and insulated to transport temperature-sensitive cargo. Cargo vehicles may be constructed using composite materials, which may lead to an absence of or reduction in metallic and wood materials and associated advantages, including simplified construction, thermal efficiency, reduced water intrusion and corrosion, and improved fuel efficiency through weight reduction, for example. However, such cargo materials must be sufficiently strong and durable to withstand the demands of normal use, both exteriorly (e.g., weather, road conditions, other vehicles) and interiorly (e.g., cargo, forklifts).

SUMMARY OF THE DISCLOSURE

A composite structure of a cargo vehicle and a method of making the same are disclosed, where the composite structure includes one or more reinforced beams. Each of the reinforced beams includes an inner core surrounded by an outer layer and one or more reinforcing structures extending through the inner core. Each of the one or more reinforcing structures provides structural support to the reinforced beams.

According to an embodiment of the present disclosure, a composite floor of a cargo body is disclosed, the composite floor having a front end and a rear end and a longitudinal axis extending from the front end to the rear end, the composite floor including: an outer skin layer that faces downwardly from the cargo body; an inner skin layer that faces upwardly into the cargo body; and a plurality of transverse beams sandwiched between the outer skin layer and the inner skin layer and extending perpendicular to the longitudinal axis, each of the transverse beams including: an inner core; an outer layer surrounding the inner core; and at least one reinforcing structure extending through the inner core and penetrating at least a portion of the outer layer on either side of the inner core.

According to another embodiment of the present disclosure, a method of manufacturing a composite structure of a cargo body is disclosed, the method including: applying a first fibrous layer onto a mold surface; arranging a plurality of preform beams onto the first fibrous layer, each of the transverse beams including an inner core, an outer fibrous layer surrounding the inner core, and at least one reinforcing structure extending through the inner core; applying a second fibrous layer onto the plurality of preform beams; applying a laminating resin to impregnate the first fibrous layer, the outer fibrous layers of the preform beams, and the second fibrous layer; and curing the laminating resin to form the composite structure.

According to yet another embodiment of the present disclosure, a preform beam configured for use in a composite structure is disclosed, the preform beam having a longitudinal axis and including: an inner core extending along the longitudinal axis; an outer fibrous layer surrounding the inner core; and a plurality of reinforcing structures extending through the inner core to the outer fibrous layer on either side of the inner core in a direction transverse to the longitudinal axis of the preform beam.

Additional features and advantages of the present invention will become apparent to those skilled in the art upon consideration of the following detailed description of the illustrative embodiments exemplifying the best mode of carrying out the invention as presently perceived.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

Corresponding reference characters indicate corresponding parts throughout the several views. For example, reference characters carrying -a, -b, -c, etc. indicate illustrative embodiments of corresponding parts throughout each of the several views. Although the drawings represent embodiments of various features and components according to the present disclosure, the drawings are not necessarily to scale and certain features may be exaggerated in order to better illustrate and explain the present disclosure. The exemplification set out herein illustrates an embodiment of the invention, and such an exemplification is not to be construed as limiting the scope of the invention in any manner.

DETAILED DESCRIPTION OF THE DRAWINGS

For the purposes of promoting an understanding of the principals of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrative devices and described methods and further applications of the principles of the invention which would normally occur to one skilled in the art to which the invention relates.

1. Cargo Vehicle

Figure 1:
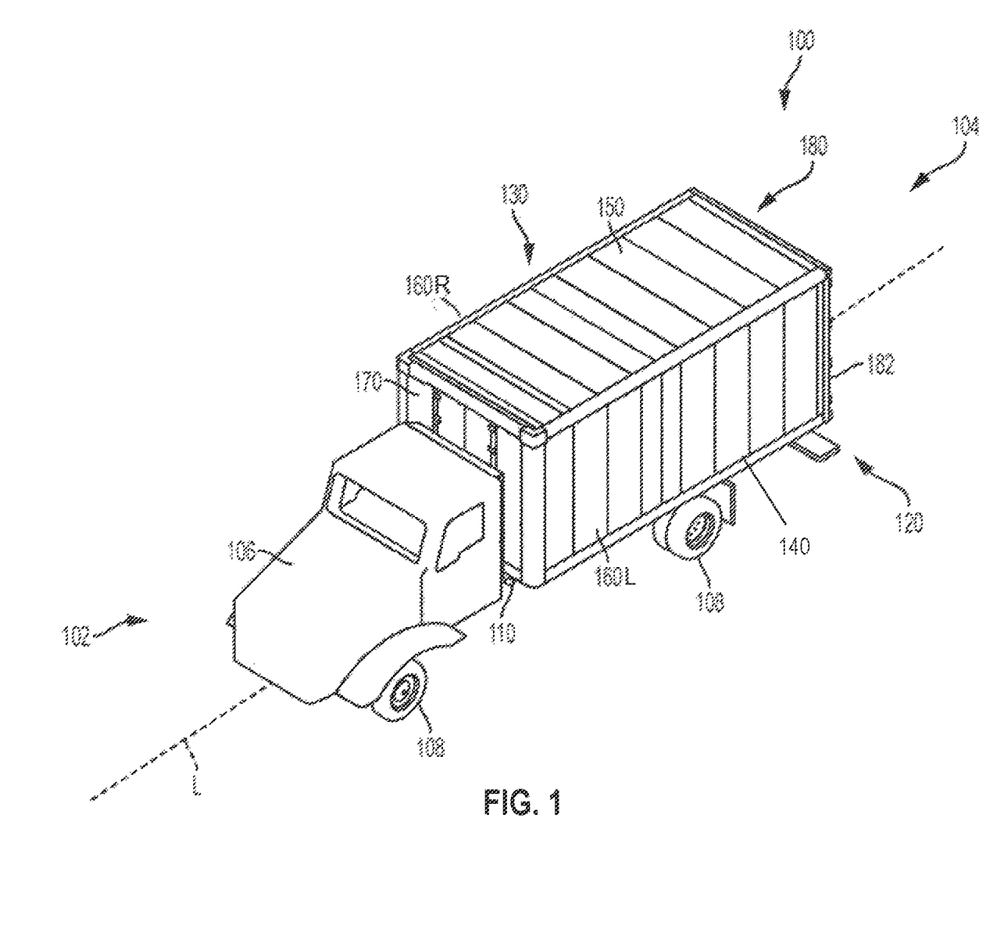
FIG. 1 is a perspective view of a cargo vehicle having a cargo body with a floor, a roof, right and left sidewalls, and a front wall.

Referring initially to FIG. 1, a cargo vehicle 100 is shown for supporting and transporting cargo. The illustrative straight frame vehicle 100 extends along a longitudinal axis L from a front end 102 to a rear end 104 and includes a motorized truck 106 that powers a plurality of wheels 108 or other traction devices, a chassis 110, and a bumper assembly 120. The illustrative vehicle 100 further includes a cargo body 130 having a floor 140 (FIG. 2) for supporting cargo, a roof 150, right and left sidewalls 160R, 160L, a front wall or nose 170, and a rear door assembly 180 having a rear frame 182 and a door (not shown) to access the cargo body 130.

In the illustrated embodiment of FIG. 1, cargo body 130 is an enclosed body that is supported atop chassis 110. Cargo body 130 may be refrigerated and/or insulated to transport temperature-sensitive cargo. While the concepts of this disclosure are described in relation to a refrigerated truck body, it will be understood that they are equally applicable to other vehicles generally, and more specifically to conventional trailers (e.g., dry freight trailers, flatbed trailers, commercial trailers, small personal trailers) and/or box or van semi-trailers, and the like. The concepts of this disclosure may have applications beyond these and other transportation structures as well, including buildings, bridge designs, and other structures capable of being formed from composite materials. Accordingly, those skilled in the art will appreciate that the present invention may be implemented in a number of different applications and embodiments and is not specifically limited in its application to the particular embodiments depicted herein.

2. Composite Floor and Other Composite Structures

Cargo body 130 may be constructed, at least in part, of composite materials. For example, the floor 140, roof 150, right and left sidewalls 160R, 160L, and/or front wall 170 of the composite cargo body 130 may be constructed of composite materials. As such, the floor 140, roof 150, right and left sidewalls 160R, 160L, and/or front wall 170 of the composite cargo body 130 may be referred to herein as composite structures or panels. Each composite structure may be a single, unitary component, which may be formed from a plurality of layers permanently coupled together. Exemplary composite materials for use in the composite cargo body 130 include fiber-reinforced polymers or plastics (FRPs), for example glass-fiber-reinforced polymers or plastics (GFRPs) and carbon-fiber-reinforced polymers or plastics (CRPs).

Figure 2:
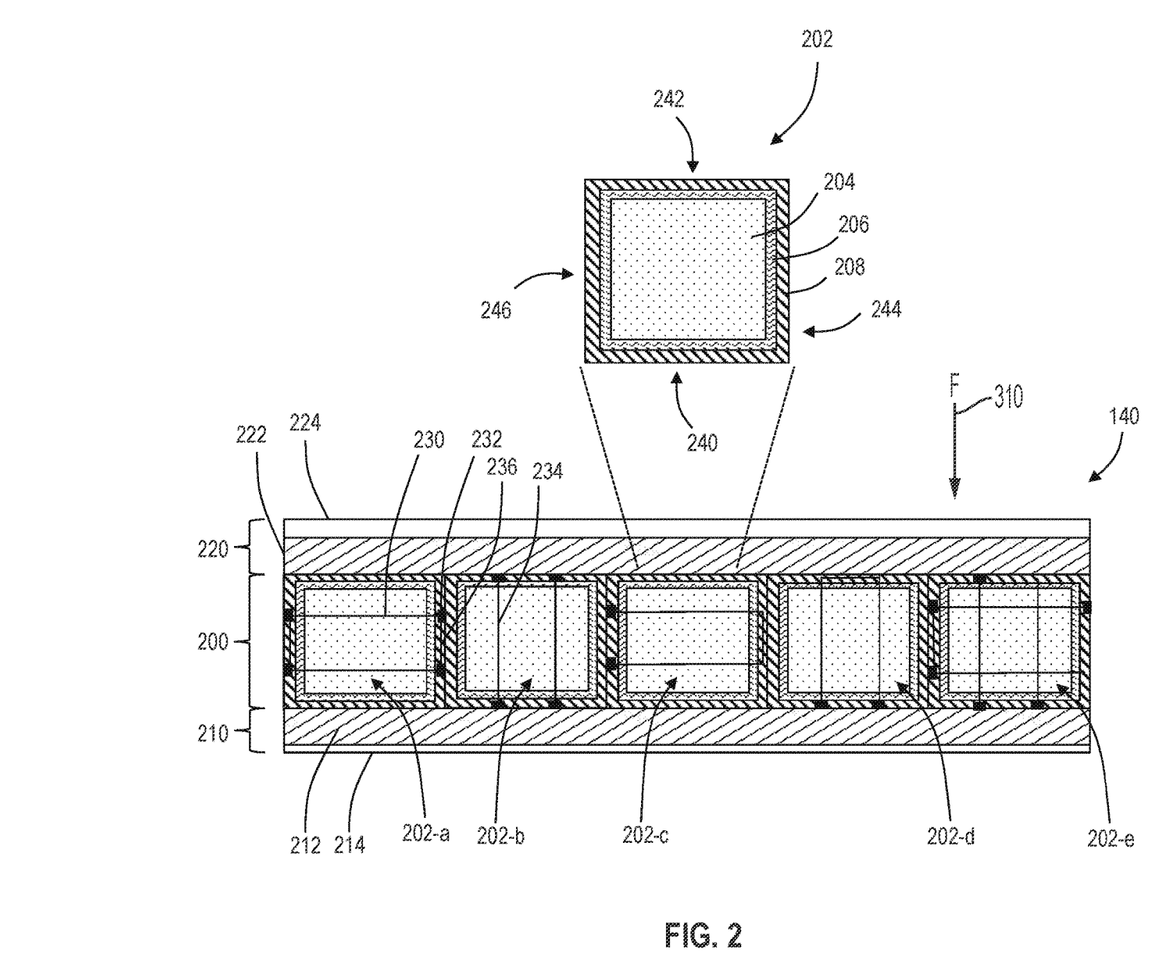
FIG. 2 is a cross-sectional view of the floor of FIG. 1 including a plurality of stitched preforms.

A portion of the laminated composite floor 140 is shown in cross-section in FIG. 2 in a transverse direction perpendicular to the longitudinal axis L (FIG. 1). Those skilled in the art will appreciate that the following teachings related to the floor 140 may also be applied to the roof 150, right and left sidewalls 160R, 160L, and/or front wall 170 of the composite cargo body 130.

The illustrative floor 140 of FIG. 2 includes a core layer 200, an outer skin layer 210 that faces downwardly from the cargo body 130 (FIG. 1) toward the surrounding environment, and an inner skin layer 220 that faces upwardly toward the cargo in cargo body 130 (FIG. 1). Each of these laminated layers 200, 210, 220 is described further below.

Referring still to FIG. 2, the core layer 200 of the composite floor 140 may include one or more structural supports or preforms 202. The illustrative core layer 200 of FIG. 2 includes a plurality of rectangular prism-shaped (more specifically, square prism-shaped) preforms 202 (illustratively, preforms 202-*a* to 202-*e*) arranged side-by-side across the floor 140, where each preform 202 extends in a transverse direction perpendicular to the longitudinal axis L (FIG. 1). Each preform 202 includes a lower surface 240, an upper surface 242, a rearward (or right) sidewall 244, and a forward (or left) sidewall 246. In this side-by-side arrangement, the sidewalls 244, 246 of each preform 202 support the sidewalls 244, 246 of neighboring preforms 202. With respect to preforms 202-*b* and 202-*c*, for example, the rearward sidewall 244 of the forwardly located preform 202-*b* would support the forward sidewall 246 of the rearwardly located preform 202-*c*. The support provided by the sidewall-to-sidewall arrangement of each of the preforms 202 prevents buckling of each of the preforms 202 when a loading force 310 is applied to the upper surfaces 242 of the preforms 202 (e.g., when a load is placed in the cargo body 130 of vehicle 100 (FIG. 1)). This side-by-side arrangement of preforms 202 may reduce the overall weight of the floor 140 of the vehicle 100.

Each preform 202 may include an inner foam core 204, an intermediate layer 206, and an outer FRP layer 208, each of which is described further below. Exemplary preforms 202 for use in core layer 200 include PRISMA® preforms provided by Compsys, Inc. of Melbourne, Florida.

The inner foam core 204 of each preform 202 may include a self-expanding, self-curing structural foam material. Suitable foams include polyurethane foams, such as a methylene-diphenyl-methane diisocyanate (MDI) based rigid polyurethane foam, for example.

The outer FRP layer 208 (which may be referred to herein as the "first" FRP layer 208) of each preform 202 may include a polymer matrix reinforced with fibers configured to enhance the structural properties of the surrounding polymer matrix. Suitable reinforcing fibers include glass fibers, carbon fibers, aramid fibers (e.g., Kevlar® fibers available from DuPont Protection Technologies of Richmond, Virginia), linear polyethylene or polypropylene fibers (e.g., Spectra® fibers available from Honeywell International Inc. of Morris Plains, New Jersey), or polyester fibers. The reinforcing fibers may be present in fabric form, which may be mat, woven, or knit, for example. Exemplary fabrics include chopped fiber fabrics, such as chopped strand mats (CSM), and continuous fiber fabrics, such as 0°/90° fiberglass fabrics, +45°/−45° fiberglass fabrics, +60°/−60° fiberglass fabrics, 0° warp unidirectional fiberglass fabrics, and other stitched fiber fabrics, for example. Exemplary fabrics are commercially available from Vectorply Corporation of Phenix City, Alabama and include the E-LM 1810 fiberglass fabric with 0° unidirectional fibers, the E-LTM 3610 fiberglass fabric with 0°/90° fibers, and the E-LTM 2408 fiberglass fabric with 0°/90° fibers, for example. Such fabrics may have an area density of about 800 g/m$^2$ to about 1,500 g/m$^2$ or more.

The intermediate layer 206 of each preform 202 may serve as a transition layer for coupling the inner foam core 204 to the outer FRP layer 208. The intermediate layer 206 may be sufficiently porous to at least partially receive foam from the adjacent foam core 204 and the polymer matrix from the adjacent FRP layer 208. The intermediate layer 206 may also be mechanically coupled (e.g., stitched) to the adjacent FRP layer 208 to simplify manufacturing, to ensure proper placement, and to prevent shifting and/or bunching. The intermediate layer 206 may be a nonwoven fabric with continuous or chopped fibers.

The individual preforms 202 of the core layer 200 may be designed to accommodate the needs of the particular application. For example, in areas of the final structure requiring more strength and/or insulation, a low-density foam core 204 may be replaced with a high-density foam core 204 or a hard, plastic block. The individual preforms 202 of the core layer 200 may also be sized, shaped, and arranged in a manner that accommodates the needs of the particular application. For example, in areas of the final structure requiring less strength, the preforms 202 may be relatively large in size, with the foam cores 204 spanning relatively large distances before reaching the surrounding layers 206, 208. By contrast, in areas of the final structure requiring more strength, the preforms 202 may be relatively small in size, with the foam cores 204 spanning relatively small distances before reaching the surrounding layers 206, 208. Stated differently, the preforms 202 may be shaped as relatively wide panels in areas of the final structure requiring less strength and as relatively narrow support beams in areas of the final structure requiring more strength.

Each preform 202 may include one or more support structures, including lateral support structures 230, vertical support structures 234, and/or sidewall support structures 236, that strengthen various structural aspects of preforms 202. Such preforms 202 having support structures 230, 234, and/or 236 may be referred to herein as "reinforced preforms". The support structures 230, 234, 236 may strengthen preforms 202 without adding significant weight to preforms 202.

Lateral support structures 230 are provided in preforms 202-a, 202-c, and 202-e of FIG. 2. Lateral support structures 230 provide lateral support and buckling resistance to each preform 202 by connecting the forward sidewall 246 to the rearward sidewall 244, thereby resisting buckling or delamination of intermediate layer 206 and/or outer FRP layer 208 from foam core 204 when subjected to the loading force 310. Lateral support structures 230 are also described with reference to FIGS. 3A and 3B in Section 4 below.

Vertical support structures 234 are provided in preforms 202-b, 202-d, and 202-e of FIG. 2. Vertical support structures 234 provide vertical support and compressive resistance to preform 202 by serving as structural columns to support the loading force 310. Vertical support structures 234 are also described with reference to FIGS. 4A, 4B, and 4C in Section 4 below.

Sidewall support structures 236 are provided in preforms 202-a, 202-c, and 202-e of FIG. 2. Depending on their orientation, sidewall support structures 236 may also provide buckling resistance and/or compressive resistance. Sidewall support structures 236 are also described with reference to FIGS. 5A and 5B in Section 4 below.

Each of lateral support structures 230, vertical support structures 234, and/or sidewall support structures 236 may be included individually (e.g., each preform 202 only including a single type of support structure), or in combination with one another (e.g., each preform 202 including multiple types of support structures), to improve the structural characteristics of preform 202. For example, reinforced preforms 202-a and 202-c include both lateral supports structures 230 as well as a sidewall support structure 236, reinforced preforms 202-b and 202-d include vertical support structures 234, and reinforced preform 202-e includes each of lateral support structures 230, vertical support structures 234, and a sidewall support structure 236. The type, number, location, and other details of support structure(s) included in preform 202 may be based on the structural improvements of each of the preforms 202 as described relating to FIGS. 3-5 herein.

Each of the support structures 230, 234, and 236 may be selected from a variety of constructs and materials. For example, the support structures 230, 234, and/or 236 may be fibers, strands, threads, rovings, filaments, wires, or other suitable constructs. The support structures 230, 234, and/or 236 may be constructed of fiberglass, plastic (e.g., polyester), metal, or other suitable materials. The selection of the type of construct and material used as the support structure may be based on the application of the specific support structures in order to achieve a desired structural improvement, as will be described in relation to FIGS. 3-5 herein.

Each of the support structures 230, 234, and 236 may be held in place within the reinforced preform 202. In certain embodiments, individual support structures 230, 234, and 236 may be held in place using any number of stoppers or anchors 232 attached to their ends. Anchors 232 may be constructed of metal, rigid plastic, or another suitable material. Anchors 232 may be embedded in FRP layer 208 where the polymer matrix and fiber reinforcement of FRP layer 208 provides a fixed point of attachment of anchor 232 to preform 202. Alternatively, anchors 232 may be positioned against the outer surface of FRP layer 208, rather than embedded in FRP layer 208. The attachment of each support structure 230, 234, and 236 to any number of anchors 232 may be based on the design and functionality of the respective support structures 230, 234, and 236. In other embodiments, adjacent support structures 230, 234, and 236 may be interconnected to facilitate such retention, with or without the need for anchors 232. In other embodiments, the support structures 230, 234, and 236 may be held in place by friction, adhesive, or other techniques, with or without the need for anchors 232.

Various retention techniques are shown in FIG. 2. For example, reinforced preform 202-a includes two lateral support structures 230 having anchors 232 at their opposing forward and rearward ends and also being interconnected with two sidewall support structures 236 to form a continuous, rectangular-shaped support structure. Reinforced preform 202-b includes two discrete vertical support structures 234 having anchors 232 at their opposing upper and lower ends. Reinforced preform 202-c includes two lateral support structures 230 having anchors 232 at their forward ends and being interconnected with sidewall support structure 236 at their rearward ends to form a C-shaped support structure. Reinforced preform 202-d includes two vertical support structures 234 having anchors 232 at their lower ends and being interconnected at their upper ends. Reinforced preform 202-e includes two lateral support structures 230, two vertical support structures 234, and one sidewall support structure 236. A rearward end of one lateral support structure 230 and an upper end of one vertical support structure 234 is shown without any anchors or interconnections.

As noted above, these teachings related to the floor 140 may also be applied to other composite structures of the composite cargo body 130, including the roof 150, right and left sidewalls 160R, 160L, and/or front wall 170. Thus, although the present disclosure focuses on reinforced preforms 202 of the floor 140, reinforced preforms 202 may also be used to construct other composite structures of the composite cargo body 130. For example, support structures 230, 234, and/or 236 may be provided in preforms 202 of other shapes, sizes, and arrangements to form other composite structures that resist buckling, withstand compressive loads, and/or retain a desired shape.

Referring still to FIG. 2, the outer skin layer 210 of the composite floor 140 may include a FRP layer 212 and an optional outer coating layer 214. The FRP layer 212 (which may be referred to herein as the "second" FRP layer 212) may be similar to the above-described first FRP layer 208, including a polymer matrix reinforced with suitable reinforcing fibers. According to an exemplary embodiment of the present disclosure, a plurality of different reinforcing fiber layers may be stacked together and used in combination to form the FRP layer 212. For example, a chopped fiber fabric (e.g., CSM) may be positioned adjacent to a continuous fiber fabric. In this stacked arrangement, the chopped fibers may help support and maintain the adjacent continuous fibers in place, especially around corners or other transitions. Also, the chopped fibers may serve as a web to resist column-type loads in compression, while the adjacent continuous fibers may resist flange-type loads in compression. Adjacent reinforcing fiber layers may be stitched or otherwise coupled together to simplify manufacturing, to ensure proper placement, and to prevent shifting and/or bunching. The outer coating layer 214 may protect the floor 140 from the surrounding environment and provide the floor 140 with a desired surface finish. In certain embodiments, the outer coating layer 214 may be a polymer-rich gel coat layer. In other embodiments, the outer coating layer 214 may include metallic (e.g., stainless steel, aluminum, coated carbon steel), polymeric, and/or composite sheets or panels, for example.

Referring still to FIG. 2, the inner skin layer 220 of the composite floor 140 may include a FRP layer 222 and an optional inner coating layer 224. The FRP layer 222 (which may be referred to herein as the "third" FRP layer 222) may be similar to the above-described first and second FRP layers 208, 212, including a polymer matrix reinforced with suitable reinforcing fibers. The inner coating layer 224 may protect the floor 140 and provide the floor 140 with a desired surface finish facing into the cargo body 130 (FIG. 1). In certain embodiments, the inner coating layer 224 of the floor 140 may be textured for improved grip in the cargo body 130. Like the above-described outer coating layer 214, the inner coating layer 224 may be a polymer-rich gel coat layer or may include metallic, polymeric, and/or composite sheets or panels, for example.

3. Manufacturing Method

The composite structures of the present disclosure may be formed by a layered molding process. An exemplary molding process for the composite floor 140 of FIG. 2 may involve (1) applying the outer coating layer 214 onto a mold surface, (2) layering the reinforcing fibers of the second FRP layer 212 onto outer coating layer 214, (3) inserting one or more of the lateral support structures 230, vertical support structures 234, and/or sidewall support structures 236 into the preforms 202, with or without anchors 232 (as described further below), (4) layering the reinforced preforms 202 of the core layer 200 onto the second FRP layer 212, (5) layering the reinforcing fibers of the third FRP layer 222, and any other desired layers onto the core layer 200, (6) wetting out the layers 212, 200, 222, and any other applied layers with at least one laminating resin to impregnate and/or coat the fibers, support structures 230, 234, 236, and/or anchors 232 (7) applying the inner coating layer 224 onto the layers 212, 200, 222, and (8) curing the materials upon the mold surface (either sequentially and/or simultaneously) to form a single, integral, laminated composite floor 140.

The inserting step (3) may involve inserting one or more of the support structures 230, 234, 236 through at least a portion of the preform 202. To manufacture preform 200-b of FIG. 2, for example, each vertical support structure 234 may be inserted through the inner foam core 204 and at least partially through the surrounding intermediate layer 206 and/or outer FRP layer 208. The inserting step (3) may involve various manufacturing techniques, such as stitching, weaving, driving, piercing, or otherwise inserting. In one example, a rigid rod may be forced through the preform 202 while pulling the corresponding support structure 230, 234, 236, similar to the action of a sewing needle. The chosen technique may vary based on the construct and material selected for the support structures 230, 234, 236. The support structures 230, 234, 236 may be inserted simultaneously or in series. The support structures 230, 234, 236 may also be inserted individually or continuously (i.e., in an interconnected manner).

In some cases, some or all of the layers 212, 200, 222 may be partially or fully pre-wet before the wetting step (6). In instances where the core layer 200 is pre-wet before the wetting step (6), the insertion of the support structures 230, 234, 236 into preforms 202 of step (3) can be performed either before or after pre-wetting the core layer 200. When the inserting step (3) is performed before any pre-wetting step and/or the wetting step (6), the laminating resin may wick through and/or around the pre-inserted support structures 230, 234, 236 and solidify the support structures 230, 234, 236 during the curing step (8). When the inserting step (3) is performed after any pre-wetting step and/or the wetting step (6), the support structures 230, 234, 236 may not be exposed to the wet laminating resin and may retain some flexibility.

The laminating resin of step (6) may be a typical thermosetting resin, such as a vinyl ester, epoxy resin, or unsaturated polyester resin, although thermoplastic resins are also contemplated. If the coating layers 214, 224 of steps (1) and/or (7) are gel-coats, the gel-coat resin may be a typical polyester gel-coat resin or a co-cure resin containing one or more elastomer components, such as urethane, co-cured with one or more laminating resin components, such as a vinyl ester, epoxy resin, or unsaturated polyester components. Exemplary co-cure resins are disclosed in U.S. Pat. Nos. 9,371,468 and 10,596,791, the disclosures of which are hereby incorporated by reference in their entireties.

Additional information regarding the construction of composite structures is disclosed in the following patents, each of which is incorporated by reference in its entirety herein: U.S. Pat. Nos. 5,429,066, 5,664,518, 5,800,749, 5,830,308, 5,897,818, 5,908,591, 6,004,492, 6,013,213, 6,206,669, 6,496,190, 6,497,190, 6,543,469, 6,723,273, 6,755,998, 6,869,561, 6,911,252, 8,474,871, 10,239,265.

4. Example Reinforced Preforms

Figure 3A:
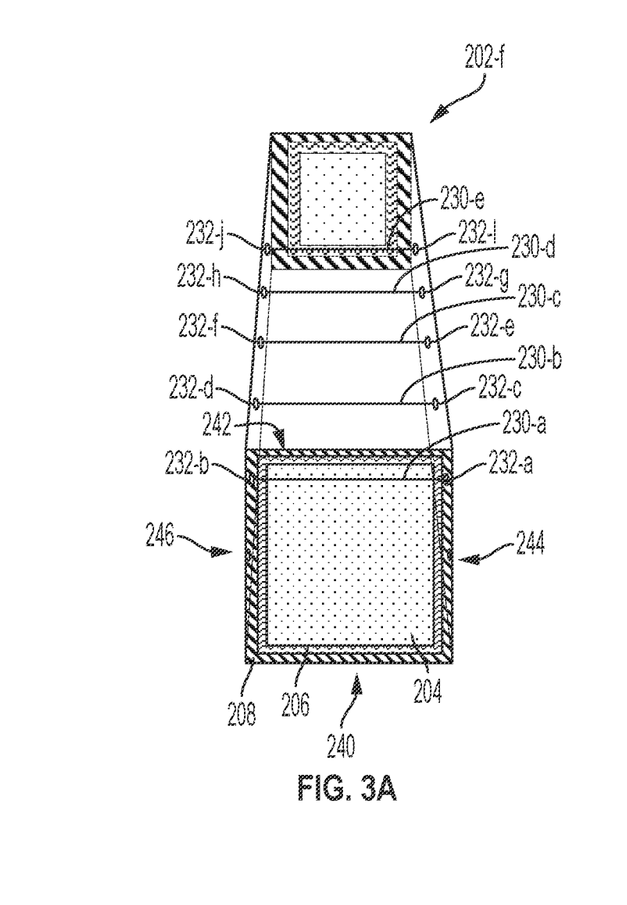
FIGS. 3A and 3B illustrate perspective views of a stitched preform beam according to a first embodiment, where an interior portion of the preform beam is hidden to reveal stitched reinforcing structures.
Figure 3B:
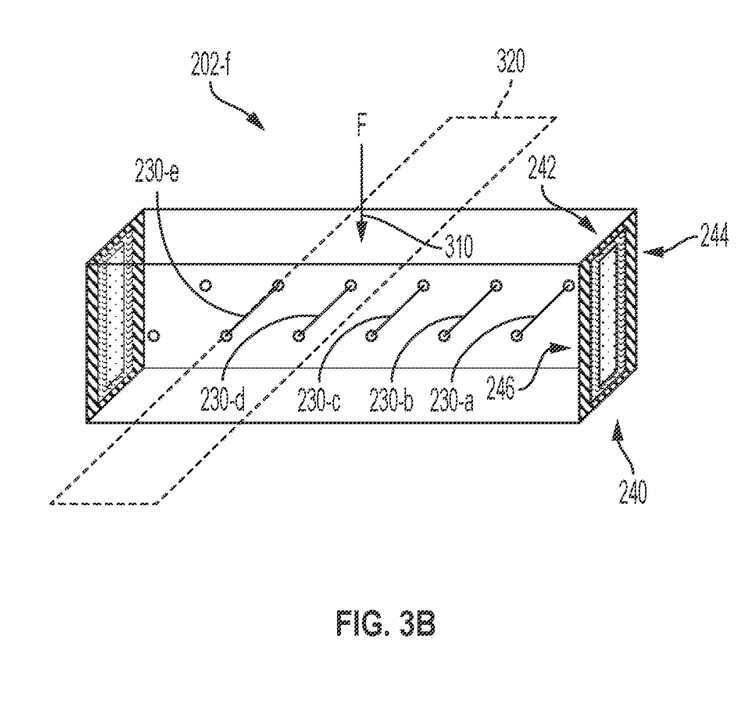
Figure 4A:
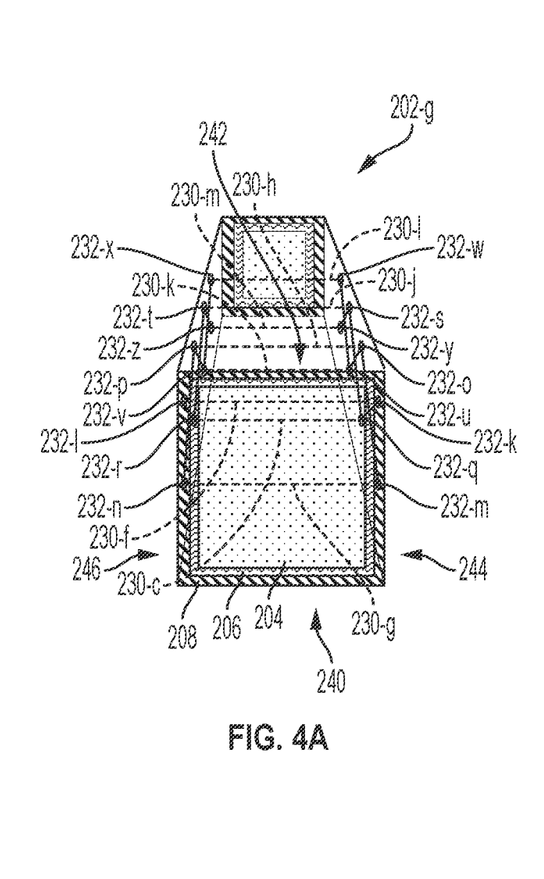
FIGS. 4A, 4B, and 4C illustrate perspective views of a stitched preform beam according to a second embodiment, where an interior portion of the preform beam is hidden to reveal stitched reinforcing structures.
Figure 4B:
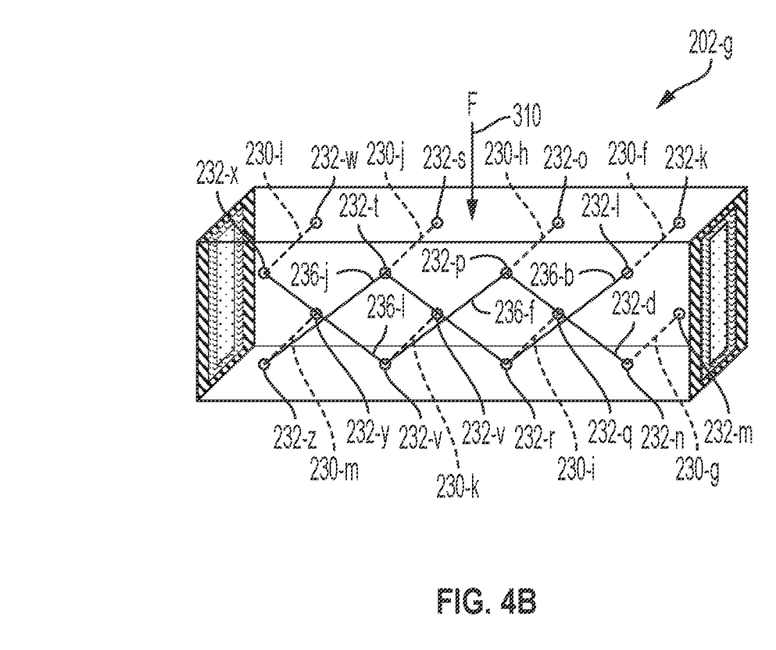
Figure 4C:
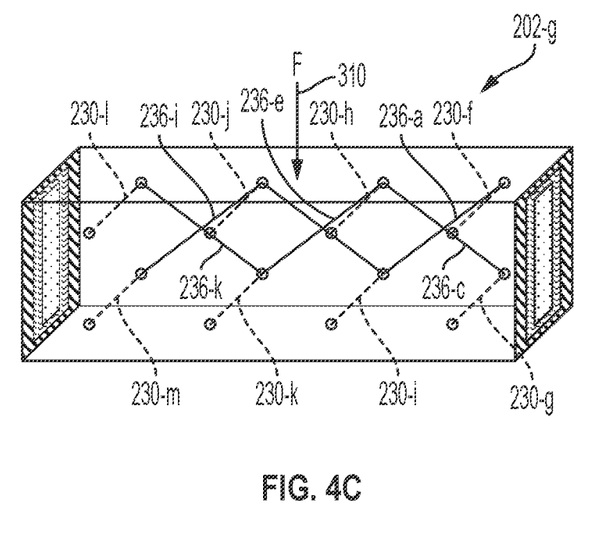
Figure 5A:
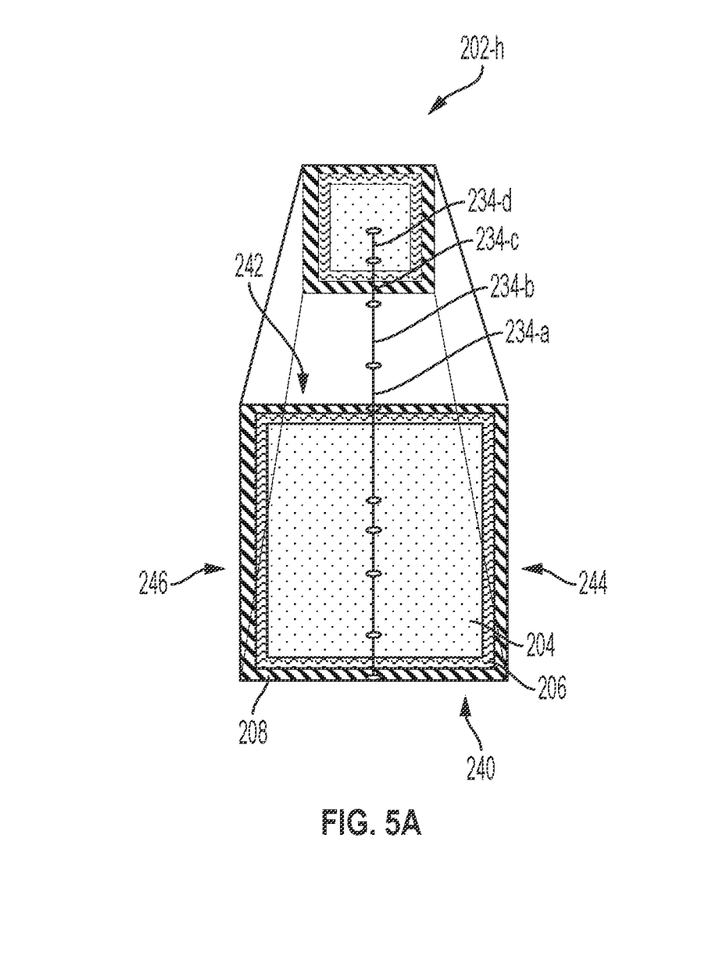
FIGS. 5A and 5B illustrate perspective views of a stitched preform beam according to a third embodiment, where an interior portion of the preform beam is hidden to reveal stitched reinforcing structures.
Figure 5B:
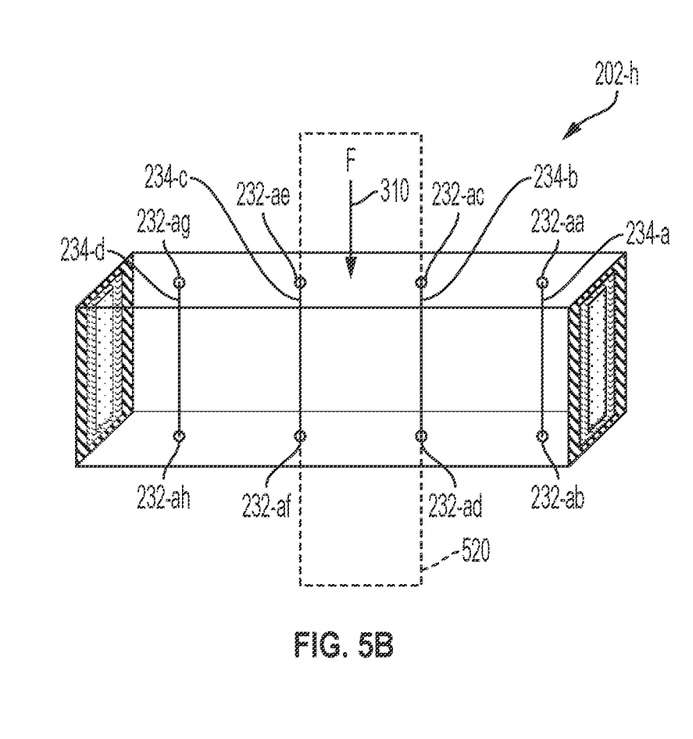

Each of FIGS. 3-5 illustrate individual embodiments of reinforced preforms 202 where one or more support structures 230, 234, 236, have been added to improve various structural features of each of the preforms 202. For example, FIGS. 3A and 3B illustrate reinforced preform 202-f where lateral support structures 230 have been inserted to improve buckling resistance. FIGS. 4A, 4B, and 4C illustrate reinforced preform 202-g where both lateral support structures 230 and sidewall support structures 236 have been inserted to improve buckling resistance and delamination resistance (e.g., skin strength). FIGS. 5A and 5B illustrate reinforced preform 202-h where vertical support structures 234 have been added to improve compressive resistance.

Although FIGS. 3-5 illustrate specific embodiments of reinforced preforms 202 where one or more types of support structures 230, 234, 236 are added to each preform 202, as described with reference to FIG. 2 above, each of the support structures 230, 234, 236 of FIGS. 3-5 can be added either alone, or in combination with one another, and in any amount, to a preform 202 to improve the structural features of the preform 202 for its intended application. Additionally, although the support structures 230, 234, 236 are described and illustrated as having a specific orientation, each of the support structures 230, 234, 236 can be angled or reoriented such that the support structure 230, 234, 236 is only substantially oriented in the described orientation (e.g., lateral support structures 230 oriented in a substantially, but not entirely, lateral direction; vertical support structures 234 oriented in a substantially, but not entirely, vertical direction; and sidewall support structures 236 oriented substantially, but not entirely, within the sidewall(s) of preform 202). Each of the reinforced preforms 202-$f$, 202-$g$, and 202-$h$ are described in detail below herein.

FIGS. 3A and 3B illustrate multiple views of a first embodiment of a reinforced preform 202-$f$ including multiple lateral support structures 230. Specifically, FIG. 3A illustrates an end view of reinforced preform 202-$f$ in a transverse direction perpendicular to the longitudinal axis L of the floor 140 (FIG. 1). FIG. 3B illustrates a side view of reinforced preform 202-$f$ in a parallel direction parallel to the longitudinal axis L of the floor 140 (FIG. 1).

Reinforced preform 202-$f$ of FIGS. 3A and 3B includes five lateral support structures 230-$a$, 230-$b$, 230-$c$, 230-$d$, and 230-$e$, however, more, or less, lateral support structures 230 can be added to reinforced preform 202-$f$ than illustrated. Each of the lateral support structures 230-$a$, 230-$b$, 230-$c$, 230-$d$, and 230-$e$ extend horizontally through reinforced preform 202-$f$ and transverse to the longitudinal axis of reinforced preform 202-$f$ from the forward sidewall 246 of reinforced preform 202-$f$ towards the rearward sidewall 244 of reinforced preform 202-$f$, which is parallel to the longitudinal axis L of vehicle 100 (FIG. 1). Illustratively, each of the lateral support structures 230-$a$, 230-$b$, 230-$c$, 230-$d$, and 230-$e$ is arranged in parallel with one another across the same horizontal plane 320 of reinforced preform 202-$f$. However, in some cases, each of the lateral support structures 230 may be arranged within different planes (e.g., not all of the lateral support structures 230 are required to lie on the same plane 320 of the reinforced preform 202-$f$).

In one example in which the lateral support structures 230-$a$, 230-$b$, 230-$c$, 230-$d$, and 230-$e$ are fiberglass rovings, a roving strand can be stitched into the forward sidewall 246 of reinforced preform 202-$f$, through reinforced preform 202-$f$ (including first FRP layer 208, intermediate layer 206, and foam core 204), and out of rearward sidewall 244 to form lateral support structure 230-$a$. Then, the roving strand can be cut to form an individual lateral support structure 230-$a$, as shown in FIGS. 3A and 3B. Alternatively, the roving strand can be stitched back into rearward sidewall 244, through reinforced preform 202-$f$, and out of forward sidewall 246 to form interconnected lateral support structures 230-$a$ and 230-$b$. These individual and/or continuous stitching processes may be repeated to form the remaining lateral support structures 230-$c$, 230-$d$, and 230-$e$.

As described above, each of the lateral support structures 230 may be attached to any number of anchors 232. Illustratively, reinforced preform 202-$f$ of FIGS. 3A and 3B includes lateral support structure 230-$a$ which is attached to two anchors—a first anchor 232-$a$ at the rearward sidewall 244 and a second anchor 232-$b$ at the forward sidewall 246. Each of the remaining lateral support structures 230-$b$, 230-$c$, 230-$d$, and 230-$e$ may also be attached to two anchors 232 in a similar fashion (e.g., lateral support structure 230-$b$ is attached to anchors 232-$c$ and 232-$d$, lateral support structure 230-$c$ is attached to anchors 232-$e$ and 232-$f$, lateral support structure 230-$d$ is attached to anchors 232-$g$ and 232-$h$, and lateral support structure 230-$e$ is attached to anchors 232-$i$ and 232-$j$). It is understood that the number and location of anchors 232 may vary. For example, it is also within the scope of the present disclosure to run a single roving strand back and forth through the reinforced preform 202-$f$ and across the sidewalls 244, 246 between the first anchor 232-$a$ and the last anchor 232-$j$, thereby forming interconnected lateral support structures 230-$a$ to 230-$e$.

Although FIGS. 3A and 3B illustrate a single embodiment of a reinforced preform 202-$f$ that includes a specific amount of lateral support structures 230 attached to a specified amount of anchors 232, more, or less, lateral support structures 230 and/or anchors 232 may be used in reinforced preform 202-$f$ than illustrated. Additionally, reinforced preform 202-$f$ can include other types of support structures, such as sidewall support structures 236 and/or vertical support structures 234, as described with reference to FIGS. 4 and 5 herein.

FIGS. 4A-4C illustrate multiple views of a second embodiment of a reinforced preform 202-$g$ including multiple lateral support structures 230 and sidewall support structures 236. Specifically, FIG. 4A illustrates the reinforced preform 202-$g$ in a transverse direction perpendicular to the longitudinal axis L of the floor 140 (FIG. 1). FIG. 4B illustrates a forward sidewall view of the reinforced preform 202-$g$ parallel to the longitudinal axis L of the floor 140 (FIG. 1). FIG. 4C illustrates a rearward sidewall view of the reinforced preform 202-$g$ parallel to the longitudinal axis L of the floor 140 (FIG. 1).

Reinforced preform 202-$g$ of FIGS. 4A-4C includes eight lateral support structures 230-$f$, 230-$g$, 230-$h$, 230-$i$, 230-$j$, 230-$k$, 230-$l$, and 230-$m$ as well as twelve sidewall support structures 236-$a$, 236-$b$, 236-$c$, 236-$d$, 236-$e$, 236-$f$, 236-$g$, 236-$h$, 236-$i$, 236-$j$, 236-$k$, and 236-$l$. However, more, or less, lateral support structures 230 and/or sidewall support structures 236 can be added to preform 202-$f$ than illustrated.

Each of the laterals support structures 230-$f$, 230-$g$, 230-$h$, 230-$i$, 230-$j$, 230-$k$, 230-$l$, and 230-$m$ extend horizontally through reinforced preform 202-$g$ and transverse to the longitudinal axis of reinforced preform 202-$f$ from the forward sidewall 246 of reinforced preform 202-$f$ towards the rearward sidewall 244 of reinforced preform 202-$f$, which is parallel to the longitudinal axis L of vehicle 100 (FIG. 1). The lateral support structures 230-$f$ to 230-$m$ are arranged in vertically-aligned pairs. For example, lateral support structures 230-$f$ and 230-$g$ are arranged in a vertical pair where lateral support structure 230-$f$ is positioned above lateral support structure 230-$g$. Both lateral support structures 230-$f$ and 230-$g$ extend through preform 202-$g$ in the same horizontal direction. The remaining lateral support structures 230-$h$, 230-$i$, 230-$j$, 230-$k$, 230-$l$, and 230-$m$ are also arranged in similar vertical pair arrangements (e.g., lateral support structure 230-$h$ is arranged vertically above lateral support structure 230-$i$, lateral support structure 230-$j$ is arranged vertically above lateral support structure 230-$k$, and lateral support structure 230-$l$ is arranged vertically above lateral support structure 230-$m$). Although illustrated in vertical pairs, each of the lateral support structures 230-$f$ through 230-$m$ may be positioned at any location within preform 202-$g$ (e.g., not necessarily being in a vertical pair arrangement as described).

As described above, each of the lateral support structures 230 may be attached to any number of anchors 232. For example, lateral support structure 230-$f$ can be attached to a first anchor 232-*k* at the rearward sidewall 244 of preform 202-*g* and to a second anchor 232-*l* at the forward sidewall 246 of preform 202-*g*. The remaining lateral support structures 230-*g*, 230-*h*, 230-*i*, 230-*j*, 230-*k*, 230-*l*, and 230-*m* may also be attached to anchors 232 in a similar fashion (e.g., lateral support structure 230-*g* is attached to anchors 232-*m* and 232-*n*, lateral support structure 230-*h* is attached to anchors 232-*o* and 232-*p*, lateral support structure 230-*i* is attached to anchors 232-*q* and 232-*r*, lateral support structure 230-*j* is attached to anchors 232-*s* and 232-*t*, lateral support structure 230-*k* is attached to anchors 232-*u* and 232-*v*, lateral support structure 230-*l* is attached to anchors 232-*w* and 232-*x*, and lateral support structure 230-*m* is attached to anchors 232-*y* and 232-*z*).

Each of the twelve sidewall support structures 236 extend transversely in relation to the longitudinal axis L, in parallel with either rearward sidewall 244 or forward sidewall 246. For example, sidewall support structures 236-*a*, 236-*c*, 236-*e*, 236-*g*, 236-*i*, and 236-*k* extend in parallel with rearward sidewall 244 and sidewall support structures 236-*b*, 236-*d*, 236-*f*, 236-*h*, 236-*j*, and 236-*l* in parallel with forward sidewall 246. The illustrative sidewall support structures 236 overlap in an x-type pattern, which may increase the strength of the sidewalls 244, 246 (e.g., increase the skin strength) of preform 202-*g* and prevent delamination from the foam core 204. For example, sidewall support structure 236-*a* crosses sidewall support structure 236-*c*, sidewall support structure 236-*b* crosses sidewall support structure 236-*d*, sidewall support structure 236-*e* crosses sidewall support structure 236-*g*, sidewall support structure 236-*f* crosses sidewall support structure 236-*h*, sidewall support structure 236-*i* crosses sidewall support structure 236-*k*, and sidewall support structure 236-*j* crosses sidewall support structure 236-*l*. The overlapping x-pattern may be determined based on the stitching/insertion of both the lateral support structures 230 and sidewall support structures 236 into preform 202-*g*. It is understood that the sidewall support structures 236 may be arranged in different orientations and locations.

As described above, each of the sidewall support structures 236 may be attached to any number of anchors 232. For example, sidewall support structure 236-*a* can be attached to anchor 232-*k* at a first end and anchor 232-*q* at a second end. In this case, anchors 232-*k* and 232-*q* secure sidewall support structure 236-*a* to the outer FRP layer 208 of rearward sidewall 244. Similarly, sidewall support structure 236-*b* can be attached to anchor 232-*l* at a first end and anchor 232-*r* at a second end. In this case, anchors 232-*l* and 232-*r* secure sidewall support structure 236-*b* to the outer FRP layer 208 of forward sidewall 246. The remaining sidewall support structures 236-*c*, 236-*e*, 236-*g*, 236-*i*, and 236-*k* can also similarly connect with anchors 232 at the rearward sidewall 244. Additionally, the remaining sidewall support structures 236-*b*, 236-*d*, 236-*f*, 236-*h*, 236-*j*, and 236-*l* can also similarly connect with anchors 232 at the forward sidewall 246.

In one example in which the support structures are fiberglass rovings, a roving strand can be stitched into the rearward sidewall 244, through preform 202-*g*, and out the forward sidewall 246 to form the lateral support structures 230-*f* The strand may then be stitched back into the forward sidewall 246, through preform 202-*g*, and out the rearward sidewall 244 to form lateral support structure 230-*i*. In this case, the roving strand that connects both lateral support structures 230-*f* and 230-*i* forms sidewall support structure 236-*b*. A similar stitching pattern can be continued to stitch the remaining lateral support structures 230-*j* and 230-*m*, where the interconnecting roving strand between each of the lateral support structures 230-*j* and 230-*m* forms sidewall support structures 236-*e* and 236-*l*. In this example, a second roving strand can then be inserted into the rearward sidewall 244 of preform 202-*g*, through preform 202-*g*, and out the forward sidewall 246 to form lateral support structure 230-*g*. Similar to the stitching of 230-*f*, the roving strand may then be stitched back into the forward sidewall 246, through preform 202-*g*, and out the rearward sidewall 244 to form lateral support structure 230-*h*. In this case, the roving strand that connects both lateral support structures 230-*g* and 230-*h* forms sidewall support structure 236-*d*. A similar stitching pattern can be continued to stitch each of the remaining laterals support structures 230-*k* and 230-*l*, where the interconnecting roving strand between each of the lateral support structures 230 forms sidewall support structures 236-*e* and 236-*l*. In this example, the remaining sidewall support structures 236 (e.g., sidewall support structures 236-*c*, 236-*f*, and 236-*k*) may be stitched separately.

Although FIGS. 4A-4C illustrate a single embodiment of a reinforced preform 202-*g* that includes a specific amount of lateral support structures 230, sidewall support structures 236, and anchors 232, more, or less, structures may be used than illustrated. Additionally, reinforced preform 202-*g* can include other types of support structures, such as vertical support structures 234, as described with reference to FIG. 5 herein.

FIGS. 5A and 5B illustrate multiple views of a third embodiment of a reinforced preform 202-*h* including multiple vertical support structures 234. Specifically, FIG. 5A illustrates the reinforced preform 202-*h* including vertical support structures 234 in a transverse direction perpendicular to the longitudinal axis L of the floor 140 (FIG. 1). FIG. 5B illustrates a side view of the reinforced preform 202-*h* parallel to the longitudinal axis L of the floor 140 (FIG. 1).

Reinforced preform 202-*h* of FIGS. 5A and 5B includes four vertical support structures 234-*a*, 234-*b*, 234-*c*, and 234-*d*, however, more, or less, vertical support structures 234 can be included in preform 202-*h* than illustrated. Each of the vertical support structures 234-*a*, 234-*b*, 234-*c*, and 234-*d*, extend vertically through preform 202-*f* (e.g., perpendicular to longitudinal axis L of vehicle 100 (FIG. 1)) from the upper surface 242 of preform 202-*f* towards the lower surface 240 of preform 202-*f*. Illustratively, each of the vertical support structures 234-*a*, 234-*b*, 234-*c*, and 234-*d*, are arranged vertically in parallel with one another within the same vertical plane 520 of preform 202-*h*. However, it is also within the scope of the present disclosure for the vertical support structures 234 to be arranged in different planes (e.g., not all of the vertical support structures 234 are required to lie within the same vertical plane 520).

In one example in which the support structures are fiberglass rovings, a roving strand can be stitched into the upper surface 242 of preform 202-*h*, through preform 202-*h* (including first FRP layer 208, intermediate layer 206, and foam core 204), and out of the lower surface 240 of preform 202-*h*. Then, the roving strand can be cut to form an individual vertical support structure 234-*a*. Alternatively, the roving strand can be stitched back into lower surface 240, through reinforced preform 202-*h*, and out of upper surface 242 to form interconnected vertical support structures 234-*a* and 234-*b*. These individual and/or continuous stitching processes may be repeated to form the remaining vertical support structures 234-*c* and 234-*d*.

As described above, each of the vertical support structures 234 may be attached to any number of anchors 232. Illustratively, vertical support structure 234-*a* is attached to two anchors 232—a first anchor 232-*aa* at the upper surface 242 and a second anchor 232-*ab* at the lower surface 240. Each of the remaining vertical support structures 234-*b*, 234-*c*, and 234-*d*, also are attached to anchors 232 in a similar fashion (e.g., vertical support structure 234-*b* is attached to anchors 232-*ac* and 232-*ad*, vertical support structure 234-*c* is attached to anchors 232-*e* and 232-*f*, and vertical support structure 234-*d* is attached to anchors 232-*ag* and 232-*ah*).

Although FIGS. 5A and 5B illustrate a single embodiment of a preform 202-*h* that includes a specific amount of vertical support structures 234 attached to a specified amount of anchors 232, more, or less, vertical support structures 234 and/or anchors 232 may be used in preform 202-*h* than illustrated. Additionally, preform 202-*h* can include any of the lateral support structures 230 and/or sidewall support structures 236, as discussed relating to FIGS. 3-5 previously.

In any of the examples illustrated and discussed relating to FIGS. 3-5, the inclusion of one or more types of support structures (e.g., lateral support structures 230, vertical support structure 234, and/or sidewall support structures 236) can be based upon the individual structural of each of the preforms 202, either alone, or in combination with one another, to form floor 140 (FIG. 2). Therefore, each of the preforms 202 included in the floor 140 may be customized via the inclusion of the various support structures 232, 234, and 236 and anchors 232 in order to meet the individual requirements of the preforms 202 that make up the floor 140 of the vehicle 100.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. A composite floor of a cargo body, the composite floor having a front end and a rear end and a longitudinal axis extending from the front end to the rear end, the composite floor comprising:
   an outer skin layer that faces downwardly from the cargo body;
   in inner skin layer that faces upwardly into the cargo body; and
   a plurality of transverse beams sandwiched between the outer skin layer and the inner skin layer and extending perpendicular to the longitudinal axis, each of the transverse beams comprising:
   an inner core;
   an outer layer surrounding the inner core; and
   at least one reinforcing structure extending through the inner core and penetrating at least a portion of the outer layer on either side of the inner core.

2. The composite floor of claim 1, wherein the at least one reinforcing structure is arranged parallel to the longitudinal axis of the composite floor.

3. The composite floor of claim 1, wherein the at least one reinforcing structure is arranged perpendicular to the longitudinal axis of the composite floor.

4. The composite floor of claim 3, wherein the at least one reinforcing structure extends vertically through the inner core.

5. The composite floor of claim 1, wherein each of the transverse beams further comprises at least one sidewall reinforcing structure extending along at least a portion of the outer layer.

6. The composite floor of claim 5, wherein the at least one sidewall reinforcing structure comprises at least a first sidewall reinforcing structure and a second sidewall reinforcing structure arranged in an overlapping x-shaped pattern.

7. The composite floor of claim 1, wherein the outer skin layer, the inner skin layer, and the outer layers of the transverse beams are laminated together with a plastic material, the plastic material also surrounding the at least one reinforcing structure.

8. The composite floor of claim 1, wherein the at least one reinforcing structure is constructed of fiberglass, plastic, or metal.

9. The composite floor of claim 1, wherein the at least one reinforcing structure is a fiber, a strand, a thread, a roving, a filament, or a wire.

10. The composite floor of claim 1, wherein the inner cores of the transverse beams are constructed of foam.

11. The composite floor of claim 10, wherein the at least one reinforcing structure comprises:
    a first end coupled to a first anchor; and
    a second end coupled to a second anchor.

12. The composite floor of claim 1, wherein the at least one reinforcing structure comprises a first reinforcing structure and a second reinforcing structure, wherein the first and second reinforcing structures are interconnected along the outer layer of the transverse beam.

13. The composite floor of claim 1, wherein the at least one reinforcing structure comprises a first reinforcing structure and a second reinforcing structure, wherein the first and second reinforcing structures are independent of each other.

* * * * *